United States Patent [19]

Friedrichs

[11] Patent Number: 4,826,468
[45] Date of Patent: May 2, 1989

[54] CHAIN TENSIONER

[75] Inventor: Karl G. Friedrichs, Leverkusen, Fed. Rep. of Germany

[73] Assignee: Klifa Fahrzeugteile GmbH & Co., Mannheim, Fed. Rep. of Germany

[21] Appl. No.: 122,270

[22] Filed: Nov. 18, 1987

[51] Int. Cl.$^4$ ............................................. F16H 7/08
[52] U.S. Cl. ................................ 474/101; 474/111; 474/140; 474/144
[58] Field of Search ............... 474/101, 109, 111, 140, 474/144, 145; 180/84; 280/152 R, 159, 160; 74/608

[56] References Cited

U.S. PATENT DOCUMENTS 4,713,043 12/1987 Biederman ..................... 474/111

FOREIGN PATENT DOCUMENTS 1245672 7/1967 Fed. Rep. of Germany .
1750684 2/1971 Fed. Rep. of Germany .
1750685 2/1971 Fed. Rep. of Germany .
3101279 12/1981 Fed. Rep. of Germany .
1408575 12/1965 France .
0200841 11/1983 Japan ................................. 474/111
1182999 3/1970 United Kingdom .

Primary Examiner—Thuy M. Bui
Attorney, Agent, or Firm—Fleit, Jacobson, Cohn & Price

[57] ABSTRACT

The chain tensioner has an arcuate curved bow with a correspondingly shaped, perforated sheet metal part extending over its entire length and which has a U-shaped cross-section. A plastics material layer is injection moulded all around said sheet metal part. A swivel bearing is located at one end, while at the other end a support part is provided, on which the bow is pressed against the chain running externally on a sliding surface.

11 Claims, 1 Drawing Sheet section A-A view X section B-B

CHAIN TENSIONER

BACKGROUND OF THE INVENTION

The invention relates to a chain tensioner or tightener with a flat, curved bow or rail made from a highly deformable plastics material and acting as a sliding shoe or contact shoe, one end of the bow being fixed in rotary manner to a carrier, whilst its other end displaceably engages on the carrier and is resiliently pressed against the chain.

A chain tensioner with these features is known (German Pat. No. 1 750 684) and serves to prevent the vibration of a chain or a V-belt, the chain or V-belt being simultaneously tensioned with the given force or tension. Such sliding shoes are preferably used as slide rails for the drive of camshafts in motor vehicle engines. This construction made from injection moulded plastic suffers from disadvantages with respect to its operating behaviour and manufacture, whilst in the long term it is not able to withstand the stresses which occur. Such a plastic bow in fact undergoes position changes as a result of cold flow or creep. It is therefore necessary to work with corresponding wall thicknesses, so that such a bow is able to withstand the mechanical and thermal stresses which occur. However, the use of greater wall thicknesses is accompanied by the risk of shrinkage cavity formation. As a result of the dimensional changes of the sliding shoe caused by the stresses which occur, there is also a modification to the fixed position and consequently an uncontrolled chain slip.

In another known construction, the bow has a part cast from metal and onto it is then engaged a separately manufactured plastic belt. However, this construction also suffers from serious disadvantages, the plastics part deforming differently from the metallic support part, so that the two parts can become detached from one another. There is a tendency of the plastics part to flow away in the case of fatigue stresses due to cold flow or creep. Due to these stresses, shape changes occur, which have an effect on the chain curve, which consequently is not given the constructionally established position. A change takes place to the tangential entry on the sliding shoe and consequently there is a change to the angle between the entry of the chain tensioner and the chain or, in other words, the chain meets the chain tensioner at an angle differing from that originally intended.

SUMMARY OF THE INVENTION

The problem of the invention is to so construct such a chain tensioner, that the curved bow maintains its shape under all temperatures and mechanical stresses.

According to the invention this problem is solved in that the metal bow is constructed as a sheet metal part traversed by a plurality of openings and that the sheet metal part is surrounded on all sides by a plastic jacket.

According to an advantageous embodiment the steel frame is provided with bores, which take up up to 70% of the sheet metal cross-section.

Advantageously guide members are provided laterally of the sliding surface for guiding the chain.

It is also proposed that for the displaceable fitting of the bow to the carrier, a support part directed away from the sliding surface is fixed to the steel frame. Advantageously the support part extends between the legs of the U-profile of the bow and injection moulding takes place around it.

It is also proposed that a bearing bush is used for fixing the bow to the carrier and is shaped onto the steel frame.

Finally, according to a further embodiment of the invention, the bearing bush comprises two portions associated with each leg of the U-profile of the bow and which are integrated into the steel frame.

The invention leads to the advantage that the component has an adequate rigidity at all temperatures and is also dimensionally stable with respect to mechanical stresses. The plastics material of the bow is prevented from undergoing positive or negative length changes. In addition, the plastics material along which the chain runs maintains its dimensional stability.

BRIEF DESCRIPTION OF THE DRAWINGS

The invention is described in greater detail hereinafter relative to a non-limitative embodiment and the attached drawings, wherein show.

DETAILED DESCRIPTION OF THE INVENTION

Figure 1:
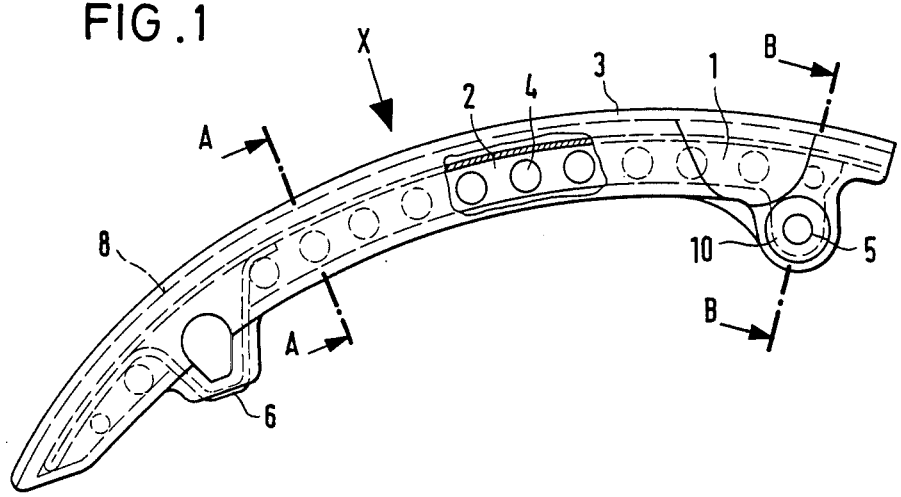
FIG. 1 A side view of a chain tensioner.
Figure 2:
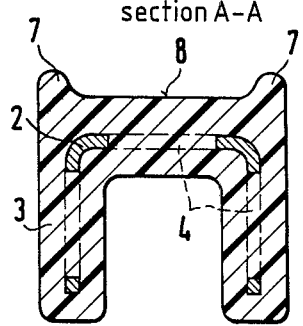
FIG. 2 A section along line A—A in FIG. 1.
Figure 3:
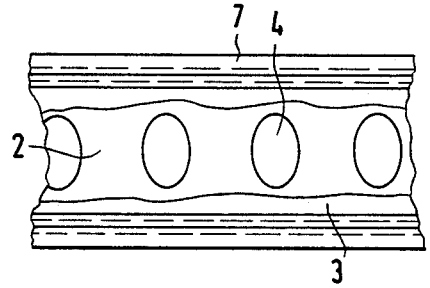
FIG. 3 A view in the direction of arrow X according to FIG. 1 with a detail.
Figure 4:
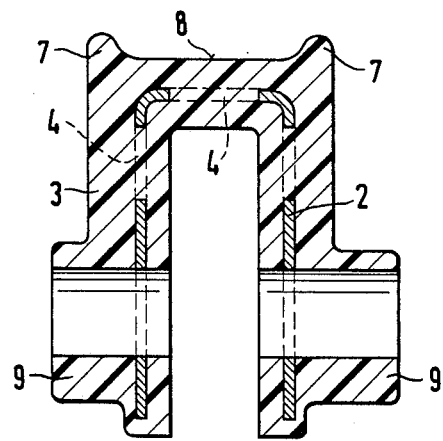
FIG. 4 A section along line B—B in FIG. 1.

Bow 1 shown in the drawing is arcuate (FIG. 1) and is on the one hand pivotably held on a carrier by means of a bearing 10 and on the other hand on a projecting support part 6 is pressed against the chain running externally on a sliding surface or shoe 8. Bow 1 has a correspondingly shaped metal frame 2, which has a U-shaped cross-section. The support part 6 is shaped onto the steel frame 2. In addition, bearing part 10, e.g. in the form of a through bearing bush 5 or portions 9 of such a bearing bush, is joined to the steel frame 2. Around said metal part 2, 6, 5 or 9 is injection moulded a thermoplastic layer 3 and for better anchoring of the plastics material 3 to the steel frame 2 bores 4 are provided in the latter. The perforated surface can represent up to 70% of the sheet metal cross-section. The carrier of the curved bow 1 is pivotably fixed to a bearing 10 and its support part 6 is pressed with the aid of a damping member against the chain. Sliding surface 8 of the chain runs on the part joining the two parallel legs of the U-profile. Sliding surface 8 is bounded by lateral guide members 7.

The complete injection moulding round with the plastics material layer 3, which can also be considered as a jacket, absorbs wear, abrasion, corrosion and chemical actions. The metal bow 1 absorbs the dynamic and static forces, as well as moments. The limited thickness of the plastics layer 3 prevents any flow of the plastics material in the area where there is engagement of the not shown chain to be guided. Good results are obtained in the case of a thickness of 2 mm for plastics layer 3. However, thicknesses between 4 and 6 mm are required in the case of conventional chain tensioners, in which the plastics material is only applied to one side of a metal carrier. This comparison makes it clear that any compression of the inventive thin plastics layer 3 is, for the same stressing, smaller than in the case of a conventional thicker part.

As a result of the plurality of openings 4 in bow 1, the plastics material is so anchored in the latter that no inadmissibly high stresses occur. The plurality of openings 4 leads to a type of "infinitessimal" securing of the plastics layer 3 on sheet metal part 2, so that free expansion of the plastics material is prevented on the entire surface thereof.

The different thermal expansions of metal and glass fibrereinforced plastic, which differ by a factor of 3, do not lead to inadmissible stresses in the case of these proportions.

As a result of the plurality of connection points between the plastics layer 3 and the sheet metal part 2, there is also a reduction in wear, because there is no relative movement between the plastics layer 3 and the sheet metal part 2. However, in the case of conventional connections the chain side bars deflect the plastics material and expand, namely until the resiliency produced in the plastics material overcomes the clamping force through the chain and the plastics material springs back.

Another advantage occurs in the manufacture of the sheet metal part. No special care as regards appearance and shape is necessary when manufacturing the openings 4, because the finished product is coated with plastic.

The openings 4 can fundamentally have a random shape. It is important that they are distributed in high density manner over the entire sheet metal part, but in particular in the vicinity of the sliding surface 8 and that they are sufficiently large to enable the plastics material to pass from one side to the other in order to achieve a firm anchoring. The anchoring of the plastics layer on the edges of the sliding surface is also assisted by the fact that the plastics layer 3 is led from the top to the bottom surface, so that the faces of the sheet metal part are also covered.

What is claimed is:

1. A chain tensioner for adjusting the tension in a chain, said chain tensioner comprising:
    a carrier;
    a bow member pivotably articulated to said carrier, said bow member comprising a frame member formed of sheet metal, said frame member having a plurality of perforations serving as anchoring means, and a plastic layer molded around said frame member and attached to said frame member at said perforations in said frame member, said perforations also serving to distribute stress applied to said bow member for preventing said bow member from being stressed above a critical stress level of said plastic layer, a sliding surface being created on an outer surface of said plastic layer of said bow member for engaging said chain when said bow member is pressed onto said chain.

2. A chain tensioner according to claim 1, wherein said perforations occupy up to approximately 70% of the surface of said frame member.

3. A chain tensioner according to claim 1, wherein said frame member has a U-shaped cross-section.

4. A chain tensioner according to claim 1, wherein said frame member and said bow member have a U-shaped cross-section, said bow member having first and second leg members extending over the entire length of said bow member.

5. A chain tensioner according to claim 4, and further including a support member for slidably fitting said bow member to said carrier, said support member extending between said first and second leg members of said bow member and wherein said plastic layer is injection molded around said support member.

6. A chain tensioner according to claim 4, and further including a bearing bush for fixing said bow member to said carrier, said bearing bush being shaped onto the frame member.

7. A chain tensioner according to claim 6, wherein the bearing bush comprises first and second extension portions associated with said first and second leg members, respectively, at said bearing bush, said first and second extension portions being integrated into said frame member.

8. A chain tensioner according to claim 1, and further including first and second guide members provided on and projecting from lateral edges of said sliding surface for guiding said bow member onto said chain.

9. A chain tensioner according to claim 1, and further including a support member fixed to said frame member and projecting outward from said sliding surface for slidably fitting the bow member to said carrier.

10. A chain tensioner for adjusting the tension in a chain, said chain tensioner comprising:
    a carrier;
    a bow member rotatably fixed to said carrier, said bow member having a U-shaped cross-section and comprising a corresponding shaped steel frame member extending over the entire length of said bow member, said frame member having a plurality of perforations serving as anchoring means, and a plastic layer injection molded around said frame member, and attaching to said frame member at said perforations, a sliding surface being created on an outer surface of said plastic layer for engaging said chain when said bow is pressed to said chain, and wherein said plastic layer is formed of highly deformable plastic material so that said bow member has a creep tendency under fatigue stress and elevated temperatures, said fatigue stress being created when one end of said bow member is pivotably attached to said carrier and another end of said bow member slidably engages said carrier and is resiliently pressed to said chain.

11. A chain tensioner for adjusting the tension in a chain, said chain tensioner comprising:
    a carrier;
    a bow member pivotably articulated to said carrier, said bow member having a sliding surface for contacting said chain when said bow member is pressed onto said chain, said bow member comprising a frame member formed of sheet metal, and a plastic layer being molded around said frame member, said sliding surface being created on an outer surface of said plastic layer of said bow member, and said bow member including first and second guide projection members provided on lateral edges of said sliding surface for guiding said bow member onto said chain.

* * * * *